United States Patent [19]
Rowell et al.

[11] Patent Number: 5,558,934
[45] Date of Patent: Sep. 24, 1996

[54] SILICON COATED MYLAR BEAMSPLITTER

[75] Inventors: Nelson L. Rowell; Edward A. Wang, both of Ottawa, Canada

[73] Assignee: National Research Council of Canada, Ottawa, Canada

[21] Appl. No.: 352,026

[22] Filed: Nov. 30, 1994

[51] Int. Cl.$^6$ ..................................................... B32B 5/16
[52] U.S. Cl. ...................... 428/333; 428/336; 428/458; 428/480
[58] Field of Search ................................. 428/458, 480, 428/333, 336

[56] References Cited

U.S. PATENT DOCUMENTS

| | | | |
|---|---|---|---|
| 4,388,400 | 6/1983 | Tabei et al. | 430/346 |
| 5,049,462 | 9/1991 | Funhoff et al. | 428/411.1 |
| 5,273,815 | 12/1993 | Brydon et al. | 428/266 |

*Primary Examiner*—Mark D. Sweet
*Attorney, Agent, or Firm*—J. Wayne Anderson

[57] ABSTRACT

The invention disclosed relates to a composite material for use in a beamsplitter for the far infrared which provides a high operating efficiency over the spectral range of 50 to 550 cm$^{-1}$. The composite comprises a thin, substantially uniformly thick synthetic resin film having low far infrared absorption, preferably polyethyleneterephthalate, and a thin substantially uniformly thick coating of a transparent material having an index of refraction of about twice that of the substrate, preferably of germanium. An improved interferometer including a beamsplitter formed of the composite is also disclosed.

6 Claims, 6 Drawing Sheets

SILICON COATED MYLAR BEAMSPLITTER

BACKGROUND OF THE INVENTION

This invention relates to infrared beamsplitters, and in particular to a composite material for use in far infra-red beam-splitter which provides for a high operating efficiency over a wide spectral range.

FIELD OF THE INVENTION

Far-infrared(FIR) spectroscopy, which involves spectral measurements in the frequency range of about 30 to 550 cm$^{-1}$, is used extensively in studies of solid-state physics.

The far infrared Fourier Transform (FT) spectrometer is the most powerful tool in far infrared spectroscopy. Although, in the sense of sensitivity the Fourier Transform spectrometer is a breakthrough in far infrared spectroscopy, due to either the low optical throughput of the instrument or the low detector detectivity in the spectral range, the signal to noise ratio is still not high enough for many applications. Therefore how to improve the optical throughput of far infrared spectrometers and eventually improve the system sensitivity is a very meaningful study.

The heart of Ft spectrometer is some kind of interferometer. A Michelson type interferometer is typically used in FT spectrometers due to its optical simplicity and mechanical advantages. A beam-splitter is part of this device.

A beamsplitter is a device that splits an incident radiation beam into two coherent parts by reflecting and transmitting some fraction of the incident beam. More specifically, the beamsplitter divides an incident, parallel beam which is incoherent and of a broad spectral bandwidth into reflected and transmitted beams at each point on a plane in the incident beam's wavefront. Hence it follows that the beamsplitter optical surface must be optically flat and uniform to approximately a tenth of the smallest wavelength in 35 the spectral range of interest. Secondly, the beamsplitter should divide the intensity of the wavefront evenly; i.e. as close as possible to a 1-to-1 ratio for reflectance to transmittance across the relevant spectral range. Thirdly, the beamsplitter should be non-absorbing which means that the sum of its reflectance and its transmittance should be as close as possible to unity, i.e. R+T=1, in the relevant spectral range. Thus the beamsplitter efficiency for Michelson interferometers, defined as two times the product R times T, can be up to 0.50 which means that the ideal interferometer can transmit up to one-half of the incident radiation with the other half reflected back towards the radiation source. Fourthly, the beamsplitter should not be strongly polarization sensitive since, in general, the incident radiation is unpolarized. In practice, this means that the beamsplitters are used only moderately off normal incidence at a relatively small angle, typically 30°.

DESCRIPTION OF THE PRIOR ART

Current beamsplitters used in far infrared Michelson interferometers can be divided roughly into 3-types i.e. (1) wedged thick substrate, (2) wire-grid polarizing and (3) single-layer, free-standing, dielectric-film beamsplitters.

The first beamsplitter type normally employs a multilayer interference coating on one side of a thick, transparent, flat substrate with low index to minimize reflection losses from the back surface of this plate which is wedged with respect to the coated surface to separate spatially the reflections from the two surfaces. Furthermore, to compensate for the extra optical path length for the beam transmitted through the substrate compared with the reflected beam, another, oppositely wedged, uncoated plate of the same material and thickness is used above the coating. Such beamsplitters, although highly efficient, are useable only above 200 cm$^{-1}$ due to the limited choice of uniform, low absorbance substrate materials which can be polished optically flat. For example, to obtain the necessary flatness ($\lambda/8$) over the typical large diameters (12 cm) used, a relatively thick (1 cm) substrate must be used to allow for accurate optical processing. This fact require that the absorption coefficient of the substrate be much less than 0.1 cm$^{-1}$ which implies the imaginary part of the refractive index, k, at 200 cm$^{-1}$ must be much smaller than $4\times10^{-5}$. For comparison, the imaginary part of the refractive index for silicon, a relatively low absorbance material commonly used as a substrate for multilayer coated filters in the far-infrared, is approximately $2\times10^{-4}$ at 200 cm$^{-1}$ (Palik 1985)[1]; i.e. too large for conventional coated beamsplitter applications.

One approach to circumvent the problems of large absorption in the substrate is to make the substrate much thinner, an approach which Vidrine and Anderson (U.S. Pat. No. 4,632,553 of 30 December 1986) seem to have employed in their solid silicon beamsplitter. By using a relatively thin silicon wafer, it appears that these authors have sufficiently reduced the beamsplitter absorption and have eliminated the need for a compensator plate. Although the details are not present in their patent, it can be deduced that these authors are using their silicon wafer at approximately a 45° angle of incidence since they claim a 45% reflectance and 55% transmittance at the beamsplitter surface and such an angle is indicated in their figures. Although these authors indicate that the back surface of the wafer is wedged with respect to the front surface, they do not state whether or not the back surface is anti-reflection coated. Although such a coating would be technologically novel and very difficult to produce for the required broadband coverage (a single layer would be insufficient), it would be necessary since, in its absence, the efficiency of the device would be diminished to only 16% of the optimum efficiency for a beamsplitter. What this means is that only the modulated intensity at the detector in an interferometer using an uncoated, wedged silicon beamsplitter is only 0.08 of the intensity at the input port of the interferometer instead of the ideal 0.5 Since they did not report a coating, we can only assume that Vidrine and Anderson did not anti-reflection coat the back surface of their beamsplitter and that their device is quite inefficient.

The second type of beamsplitter employed in FT-IR spectrometers uses wire-grid, polarizing elements (Cuisenier 1992[2], Martine 1982[3], Dignam 1981[4]); i.e. the Martin-Puplett interferometer. The advantages of the wire-grid beamsplitter are purported to be (1) wide spectral range, (2) high beamsplitter efficiency, and (3) no dc offset in the interferogram. However, for an interferometer using a single detector, the polarizingbeamsplitter is potentially only one-half as efficient as the ideal beamsplitter since 50% of the incident radiation is rejected by the input polarizer. To overcome this limitation, the usual approach has been to use extra polarization rotators and two detectors, one for each polarizations, whose outputs are summed electronically. As previous authors (Carli 1987[5], Cuisenier 1992[2]) indicate, the best performance for this type of system depends on the wire spacing, and, in the grids normally used, is obtained for frequencies below 150 cm$^{-1}$. Furthermore, the beamsplitter efficiency for a two-detector interferometer is typically 0.3 for frequencies up to 150 cm$^{-1}$ and lower above that frequency. Thus, it would seem that the additional complications of polarizers and an extra detector point are barely justified by the slight improvement in performance over conventional free-standing film beamsplitters at low frequencies. Hence, it appears certain that the polarizing interferometer cannot have an optimum efficiency over the whole range from 40 to 55 cm$^{-1}$.

The third type of beamsplitter uses single-layer, free standing, dielectric films as described in Cuisenier 1992, Martin 1980[2] Kampffmeyer 1977[7]) for the far-infrared The present far-infrared beamsplitter using a single Mylar (trademark for a polyethyleneterephthalate film) is essentially the same as originally introduced (Gebbie 1956)[8] although, since the, better beamsplitter performance has been obtained because of improved material quality. The advantages of mylar include low enough absorptivity, relatively high reactive index (1.72) compared with other polymer-type films (Kampffmeyer 1977)[7], the low cost of the material, and the ease of making a beamsplitter. However, there are shortcomings in this type of beamsplitter most notably the variable beamsplitter efficiency of the device. In fact, due to interference in the film for a particular Mylar thickness, the film is like a Fabry-Perot interferometer in that there are optical frequencies at which the reflectivity and beamsplitter efficiency are exactly zero. At these frequencies the particular Mylar thickness cannot be used for a beamsplitter and another thickness has to be substituted. For this reason, several Mylar beamsplitters are used to span the far-infrared spectrum. Another deficiency of Mylar beamsplitters is their modest beamsplitter efficiency which, due to the lower than optimum dielectric constant of Mylar, is less than 72% of the maximum theoretical efficiency (=0.5) that would occur with a film of 50% reflection and 50% transmission. Furthermore, this efficiency is greater than 0.25 over a narrow range of the far-infrared spectrum. With absorbing films, the efficiencies are even lower and some effects of absorption are seen for Mylar between 350 and 700 cm$^{-1}$ (Kampffmeyer 1977).[7]

SUMMARY OF THE INVENTION

It is an object of the invention to provide a composite material for use in a far infrared beam-splitter.

It is another object of the present invention to provide a far infrared beam-splitter of increased bandwidth in order to cover the spectral range of 50 to 550 cm$^{-1}$ with a single beam splitter of high efficiency.

According to one aspect of the invention, a composite material for use in a far infra-red beam splitter is provided, comprising a substrate in the form of a thin, substantially uniformly thick film of a synthetic resin having low far infra-red absorption selected from the group consisting of polyethyleneterephthalate, polycarbonate, polyimide, polyvinylchloride, polypropylene and polyethylene, and a substantially uniform thickness coating of a transparent material having an index of refraction of about twice that of the substrate.

According to another aspect of the invention, an improved infrared interferometer is provided, said interferometer having a source of infrared radiation, a fixed reflector, a moving reflector and a beamsplitter for directing said infrared radiation to said reflectors, the improvement wherein the beamsplitter comprises a composite as described above having substantially optically flat leading and trailing surfaces.

Preferably, the beamsplitter is disposed such that the incident infrared radiation is directed at an angle of about 30° to the normal of the leading surface of the beamsplitter.

Several polymers, for example Mylar (polyethylene terephthalate), polycarbonate, polyimide, polyvinylchloride, polypropylene, and polyethylene, could be suitable low index substrate materials (Kampffmeyer 1977[7]), the disclosure of which is incorporated herein by reference, based on their low far-infrared absorption. There are several other requirements that have to be satisfied for a thin film to be used as a far-infrared beamsplitter which also apply when using the polymer film as the first layer in a two layer system. The film's absorption coefficient must be low enough in the far-infrared for a good beamsplitter efficiency. Mechanically the film must have sufficient elasticity and strength to be stretched optically flat over the beamsplitter mount and the film must retain enough elasticity to maintain its flatness over long periods of time even when coated. Although not possessing the lowest absorption coefficient among the polymers, Mylar meets these requirements and has the additional advantage of being readily available in suitable thicknesses as well as being a well studied substrate material for thin film coatings. Mylar has significant absorption especially in the range above 350 cm$^{-1}$ and an improvement in beamsplitter performance between 350 and 600 cm$^{-1}$ could be achieved by using a material of lower absorption such as polpropylene. Even below 350 cm$^{-1}$ the absorption of Mylar is greater than 10% for layers of thickness greater than approximately 10 μm.

The choices for high refractive index materials for coatings for far-infrared filters is limited. Possible materials include zinc sulfide (ZnS), germanium (Ge), and silicon (Si). However ZnS must be discarded since it has a very strong absorption (k=11.8) at 276 cm$^{-1}$ (Palik 1985)[1]. Crystalline silicon, often used for substrates for far-infrared interference filters, initially appeared promising since it has a very low extinction coefficient, and a nearly an ideal refractive index (2 times Mylar's) for manufacturing interference coatings in combination with Mylar. However, the deposited layers on Mylar were found to have properties more resembling those of amorphous silicon which is approximately 100 times more absorbing than crystalline silicon and, if hydrogenated, has a lower refractive index near 2.8. Furthermore, the adhesion of silicon to Mylar is poor and the film density is much lower than the bulk material. Germanium proved to be the best material of this group for our application. In previous work it was shown that the reactive index of amorphous germanium is similar to crystalline germanium and that the extinction coefficient is low enough (below 0.1) for our application in the far-infrared.

Preferably, the high index coating is overcoated with a thin layer of a suitable protective coating such as $Al_2O_3$ and SiO3 of a thickness range of 20–60 nm. A1203 of a thickness of about 20 nm is preferred.

DETAILED DESCRIPTION OF THE PREFERRED EMBODIMENTS OF THE INVENTION

This invention involves the deposition of films of a high refractive index material onto lower index polymer films to form a multilayer interference system. One basic goal is to obtain the simplest possible multilayer system which has an average refractive index closer to the ideal one for a 50–50 transmittance-reflectance, free-standing film at a given angle of incidence. However, even a single layer of the ideal index would suffer from having a vanishingly small efficiency at particular frequencies and a more important goal is to reduce these Fabry-Perot effects in order that there be no zero's in beamsplitter efficiency within the spectral range of interest. For this reason, at least two layers are needed and we shall see that a simple, two layer system can give very good performance over a large spectral range. In fact to produce a beamsplitter which does not absorb significantly, we must keep the number of layers to a minimum due to the fact that thicknesses of interference layers must be large in the far-infrared and the absorbances of available materials for this range are also large. The approach that we will describe is to deposit a single high index layer on a thin film polymer layer.

Fabrication Methods

Figure 1:
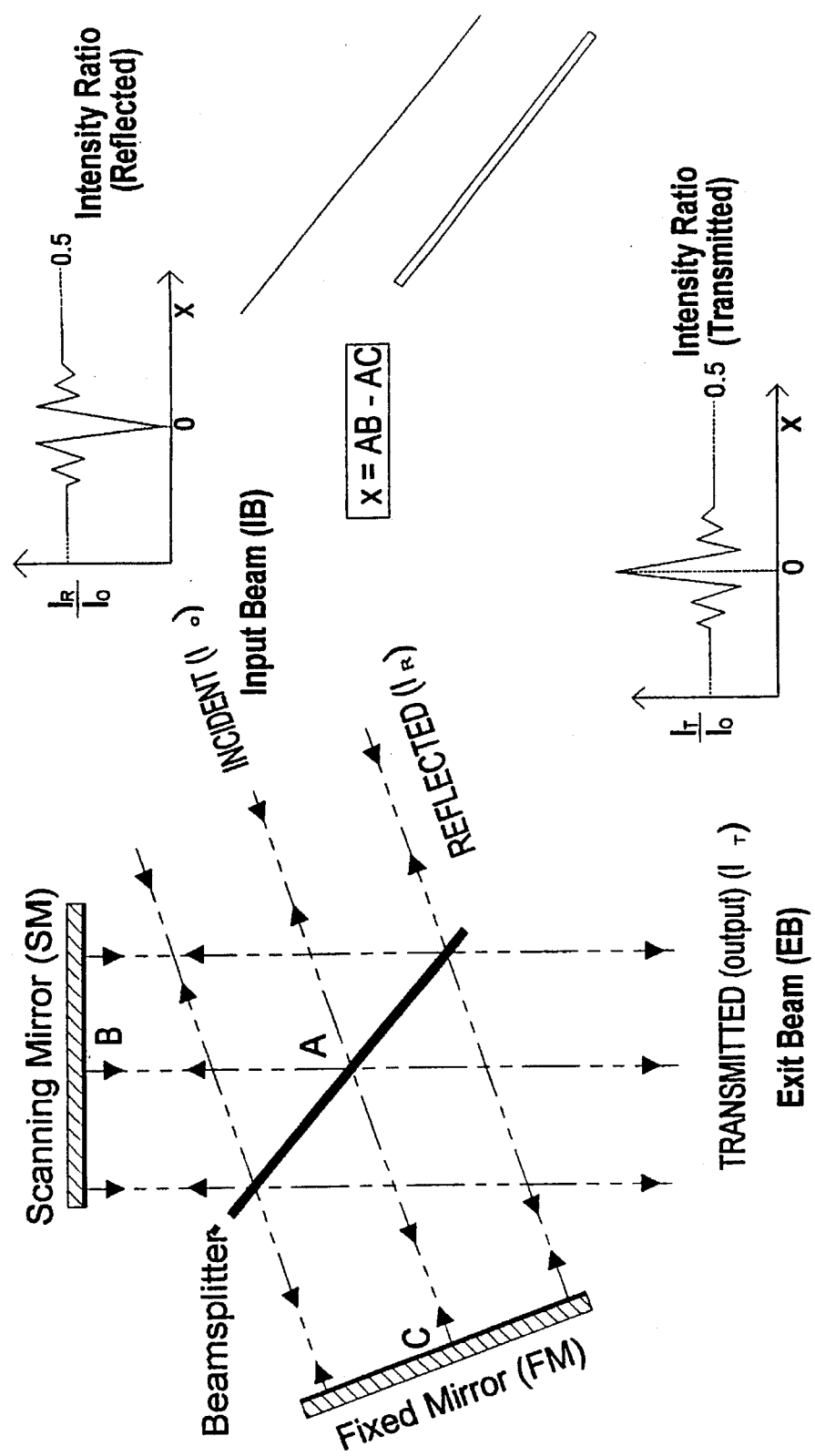
FIG. 1 is a perspective illustration of a Prior Art Interferometer of the Michelson-type.

As seen in FIG. 1, a conventional Michelson-type interferometer layout is illustrated, operating with the incident beam (IB) at 30° to the normal of the beamsplitter's (B) leading surface. The beamsplitter reflects and transmits the incident radiation to the fixed mirror (FM) and the scanning mirror (SM) which retroreflect the beams to the beamsplitter where interference occurs. The beam exiting the interferometer on transmission (EB) is normally directed to a detector (not shown) for measurement of the intensity modulation caused by scanning. In order to manufacture bilayer beamsplitters by vacuum deposition of the high index material (germanium) onto the low index substrate (Mylar), some criteria must be met by the substrate. Firstly the melting temperature of the substrate must be high enough so that the substrate survives the deposition. Mylar's melting temperature of 190° C. meets this condition. Secondly the substrate material must have substantially uniform thickness and optical constants over an area greater than the typical beamsplitter diameter (12 cm) as is the case for Mylar. This optical thickness was determined from the relative positions of the transmission maxima as measured in an infrared spectrophotometer from 20 to 1000 $cm^{-1}$. We have also determined the Mylar extinction coefficient by this method. Thirdly the substrate must remain substantially elastic after coating to allow optical flattening of the beamsplitter by stretching. We found that Mylar met this condition.

Electron-beam evaporation was used to produce 1 to 2 µm thick germanium films on 6 µm thick Mylar at base pressures in the range 0.2 to $0.7\times10^{-5}$ mbar and at deposition rates around 0.5 nm/s. Monitoring of the film thickness during deposition was not possible with the available near-infrared optical monitor which did not allow us to measure at a sufficiently large wavelength. Instead crystal quartz deposition rate monitor was used in situa and the total film thicknesses were measured after deposition using a Dektak profiler to calibrate the rate monitor. Although some non-uniformity of the layer across the 700 mm diameter coated area was observed the quality of the germanium films proved adequate. On a smaller lateral scale, cracking of the germanium film occurred in lines approximately every 1 cm. However this phenomena did not affect greatly the beamsplitter performance. To improve the density of the films and their adhesion, low energy argon ions were used in the deposition. A protective coating of 20 nm of $Al_2O_3$ applied to the germanium in the deposition chamber proved effective and did not affect the optical functioning of the beamsplitters.

When coating was complete and the coated material had cooled, it was removed from the coating plant and beamsplitters were constructed by mounting the material clamped between two stainless steel rings. At that point the beamsplitter membrane was somewhat slack and it was stretched tight by applying heat to the beamsplitter in this way readying the beamsplitter for testing.

Results

The test method used was to compare the performance of the coated beamsplitters with uncoated beamsplitters in actual use; i.e. in a commercial FT-IR spectrometer. The spectrometer used was a Bomem DA3 instrument which is evacuable and has far-infrared capability down to 5 $cm^{-1}$. Hence our bilayer beamsplitters were constructed in mounting rings compatible with this spectrometer. Since our goal was to have a single beamsplitter that functioned at least as well as the best bare mylar beamsplitter at any frequency between 50 and 550 $cm^{-1}$, our procedure for testing was to measure the raw spectrum with our bilayer beamsplitter and compare it with the spectra for 3, 6, 12, and 25 µm Mylar beamsplitters with the same source and detector. These are the thicknesses of bare Mylar normally used to span this spectral range. With this method the size of the ordinate is proportional to the beamsplitter efficiency and, between two beamsplitters, the ratio of the raw ordinates equals the efficiency ratio. Such a comparison of beamsplitter performance is reasonable even with the non-negligible polarization of the radiation that occurs in the DA3 interferometer.

Figure 2:
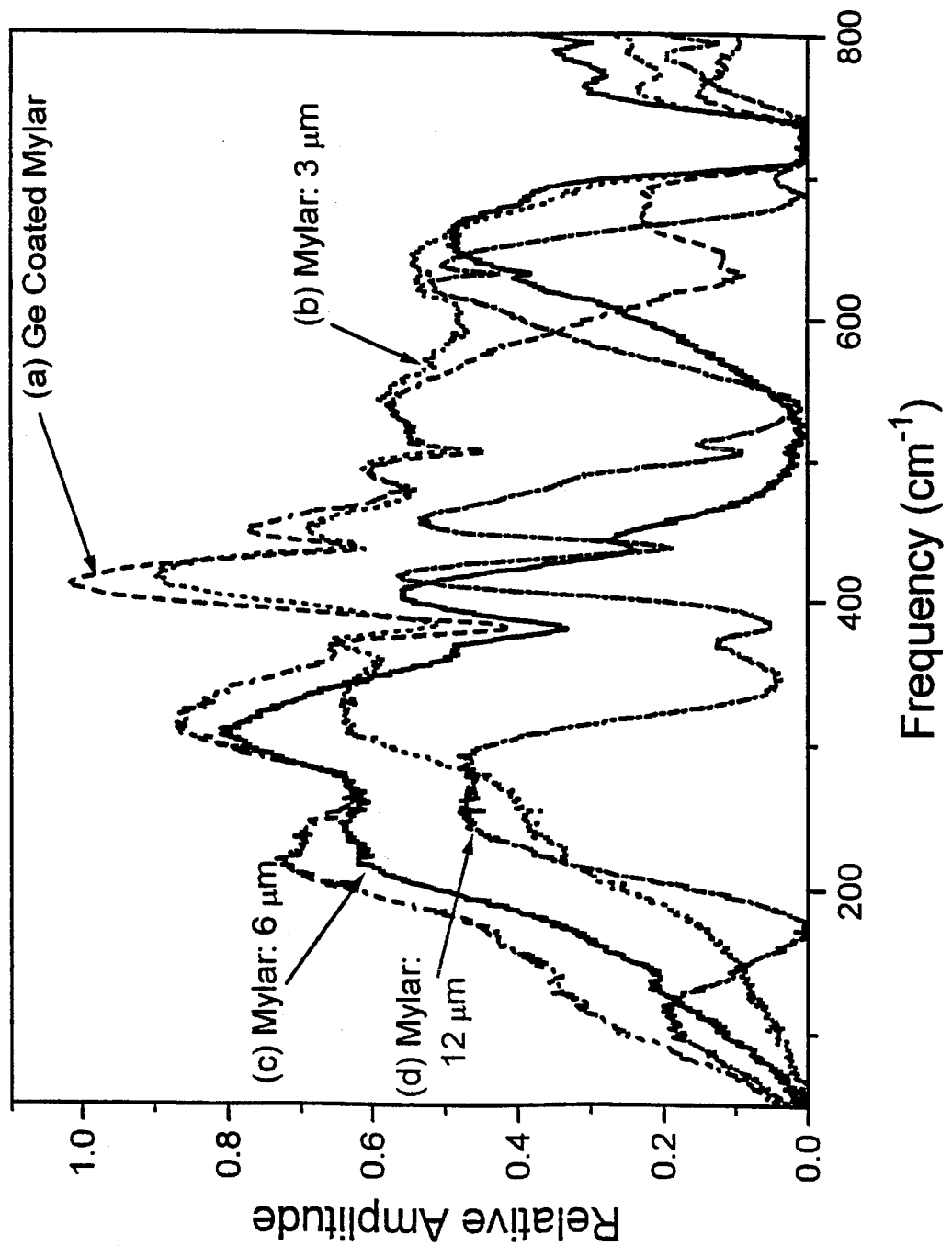
FIGS. 2, 3 and 5 are graphs illustrating the comparative performance of a bilayer beamsplitter according to the invention, comprising a 1.8 micron coating of germanium on a 6 micron Mylar film, single Mylar layers of various thicknesses.

In FIG. 2 we show the raw spectra taken with a DTGS detector for (a) a bilayer beamsplitter consisting of 1.8 µm of evaporated germanium on a 6 µm Mylar film, (b) a 3 µm Mylar beamsplitter, (c) a 6 µm Mylar beamsplitter, and (d) a 12 µm mylar beamsplitter. The bilayer beamsplitter had a protective overcoating $Al_2O_3$ of thickness 20 nm. A Mylar thickness of about 6 µm was selected on the basis that its beamsplitting efficiency (as a single layer) is moderate over a wide far-IR spectral range. It will be appreciated by those skilled in the art that somewhat thicker or thinner layers will work, but not as efficiently. All of the spectra in this figure were taken under the same experimental conditions for the radiation source, instrumental aperture, resolution, scanning speed, and detector. Only the beamsplitter was changed between spectra and this change was done carefully to avoid misaligning the beamsplitter mount. From FIG. 2 we see that, except in a narrow range near 400 $cm^{-1}$ where the Mylar absorbs significantly ($\alpha \sim 750$ $cm^{-1}$), the bilayer beamsplitter meets our design objectives and performs better than any of the uncoated beamsplitters. From FIG. 2, it is apparent that the bilayer beamsplitter has a non-zero reflectance up to approximately 700 $cm^{-1}$ although the 3 µm beamsplitter has a higher efficiency for frequencies above approximately 560 $cm^{-1}$. Also, the bilayer beamsplitter has the highest efficiency at the lower end of the spectrum (50 $cm^{-1}$).

Figure 3:
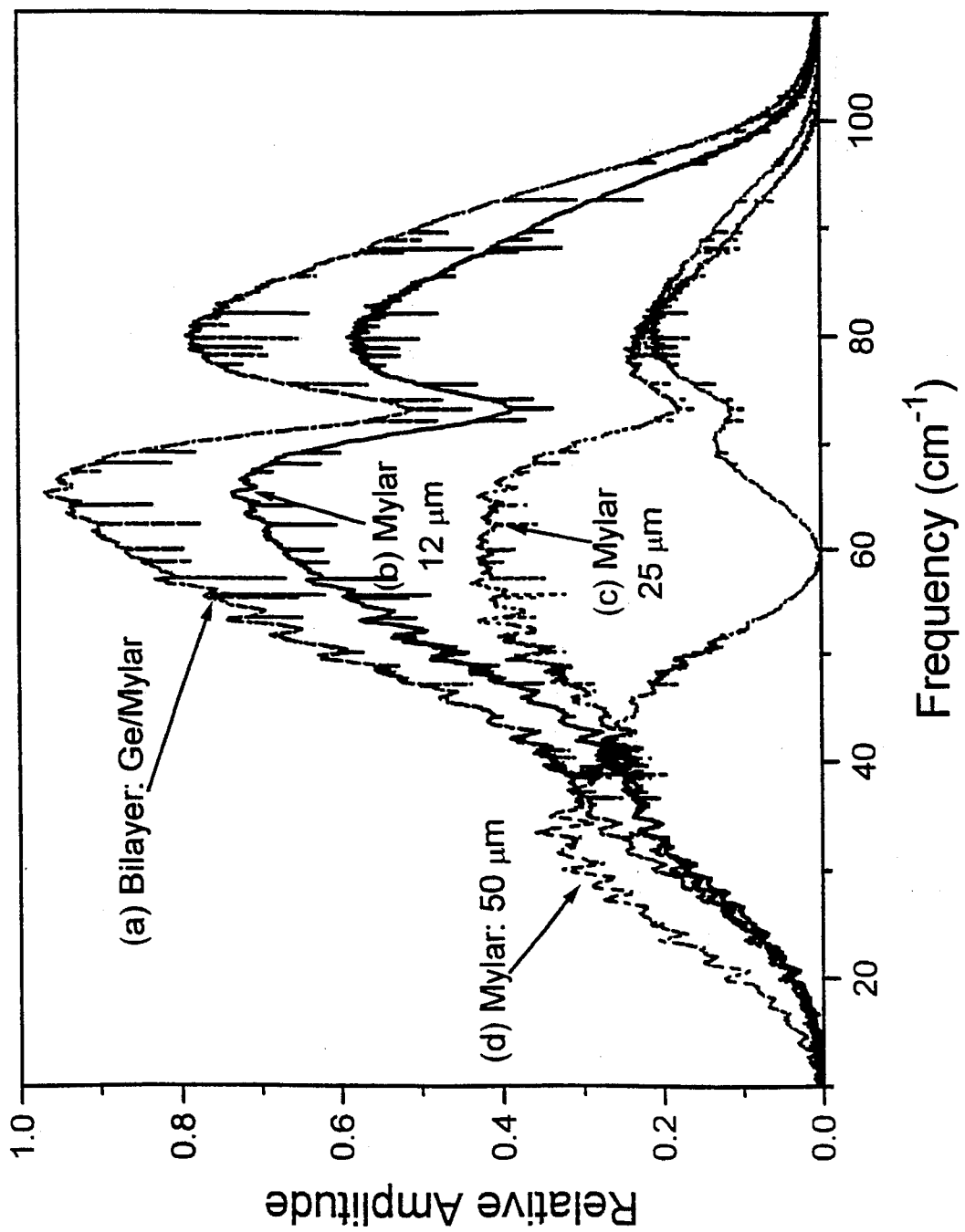

More details of the bilayer beamsplitter's low frequency performance are given in FIG. 3 where we show its spectrum (trace a) and the spectra for (b) 12 µm, (c) 25 µm, and (d) 50 µm bare mylar beamsplitters. All these spectra were taken for a resolution of 0.02 $cm^{-1}$ with a mercury lamp source detected with a liquid helium (2K) bolometer which was filtered to respond between 5 and 100 $cm^{-1}$. The sharp absorption lines in the spectrum were due to water vapor in the spectrometer which was evacuated to 0.5 T. The broad absorption feature near 70 cm$^{-1}$ came from the polyethylene base of the detector's cold filter. From these spectra we see that the bilayer beamsplitter divides the beam down to approximately 20 cm$^{-1}$ although the 50 μm bare mylar is more efficient below 37 cm$^{-1}$.

The results in FIGS. 2 and 3 demonstrate that there is no reason to use a 6, 12, or 25 μm bare Mylar beamsplitter instead of the bilayer beamsplitter, instead quite the contrary. The 3 μm beamsplitter has questionable utility since it has higher efficiency than the bilayer beamsplitter only above 560 cm$^{-1}$ where, in any event, the standard coated-KBr beamsplitters are superior to all Mylar based beamsplitters Below 37 cm$^{-1}$ the 50 μm Mylar beamsplitter should be used since it performs better than the bilayer beamsplitter. Above this frequency, however, the bilayer beamsplitter becomes rapidly much more efficient than the 50 μm beamsplitter.

We shall now show the effect on beamsplitter performance of varying the germanium (Ge) thickness. The optimum thickness for Ge deposited on 6 μm Mylar was determined theoretically to be 1.75±0.1 μm. Experimentally, this range was confirmed by depositing Ge films over a range of thicknesses from 1 to 2.1 μm and we present, here, the results for two Ge films of thicknesses 1.01 and 2.08 μm, both on a 6 μm Mylar pellicle. These results will show in a practical sense why a Ge thickness of approximately 1.75 μm provides best beamsplitter performance.

Figure 4:
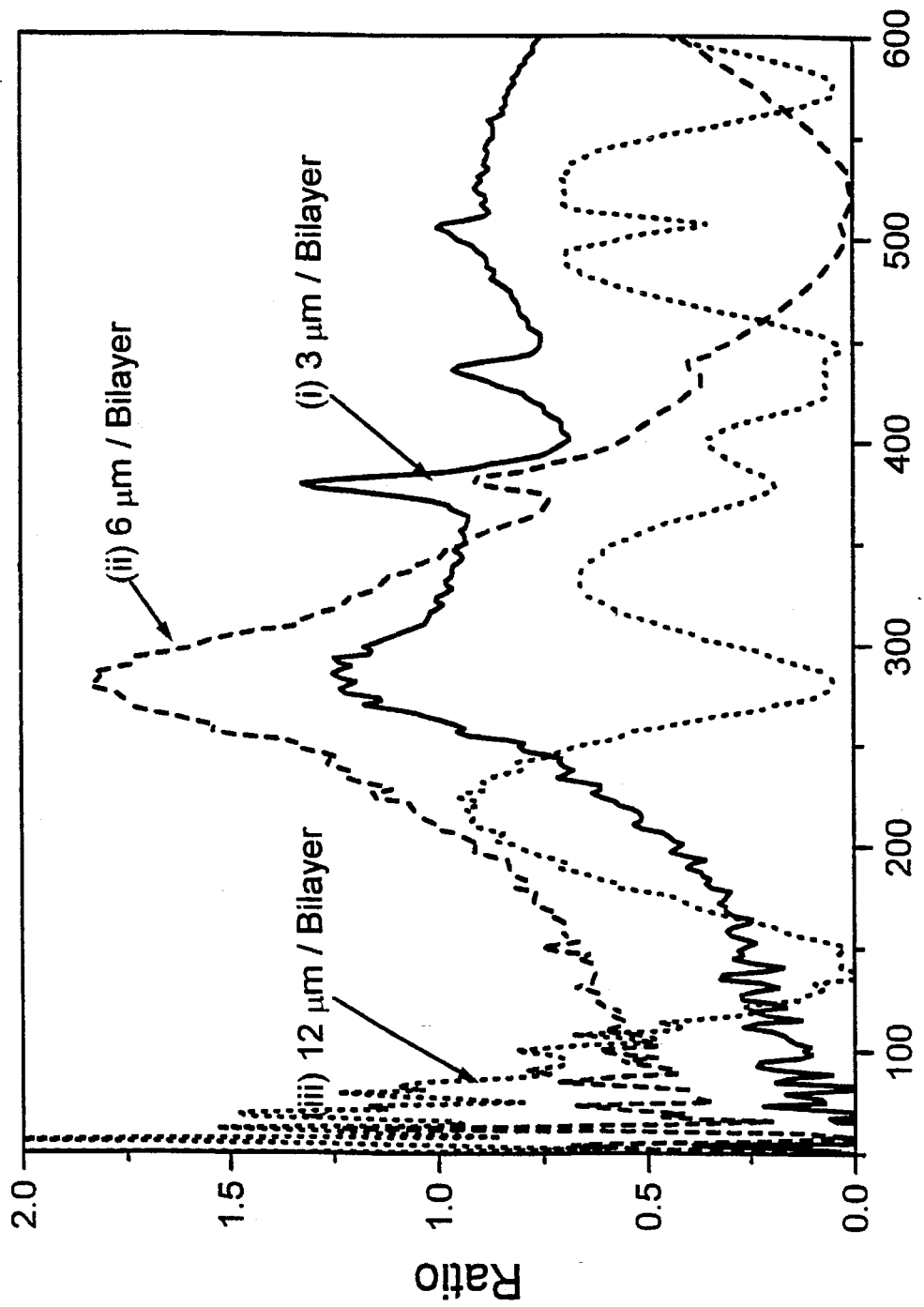
FIG. 4 is a graph illustrating the comparative performance of a 1.01 micron coating of germanium on a 6 micron Mylar film, to various thicknesses of bare Mylar films.
Figure 5:
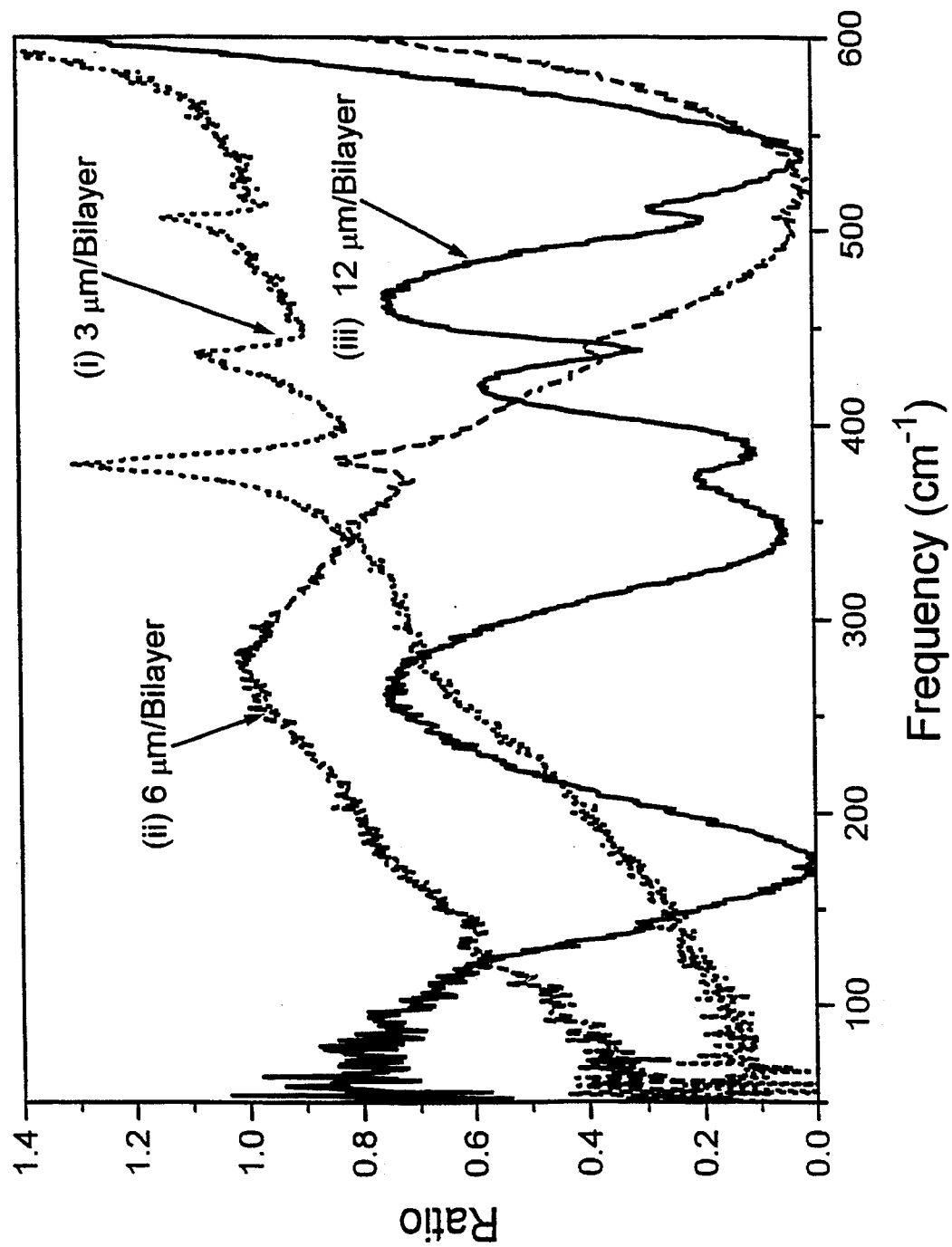

FIG. 4 shows the amplitude ratios for a bilayer beamsplitter with 1.01 μm of Ge on 6 μm of Mylar. In FIG. 5, these ratios are obtained by dividing the raw spectra for bare 3, 6, and 12 μm Mylar beamsplitters with the raw spectrum from the bilayer beamsplitter. As before, a ratio of less than unity indicates that the bilayer beamsplitter is performing better than the particular bare mylar beamsplitter for which that ratio was obtained. As can be seen from FIG. 4 the bilayer beamsplitter of this Ge thickness has comparable performance to the 3 μm Mylar beamsplitter over the range 50 to 550 cm$^{-1}$. It also performs better than the 12 μm Mylar beamsplitter over this range. This bilayer beamsplitter has considerably lower efficiency than the 6 μm Mylar beamsplitter over a significant part of this range as can be seen from the peak in the ratio for this mylar beamsplitter around 280 cm$^{-1}$. Nonetheless, this bilayer beamsplitter can be used over the whole range from 50 to 550 cm$^{-1}$ having a non-zero efficiency at all frequencies. The bilayer beamsplitter consisting of 1.8 μm of Ge on a 6 μm mylar pellicle provides better overall performance over the whole of this range as can be seen by comparing FIGS. 4 and 5.

Figure 6:
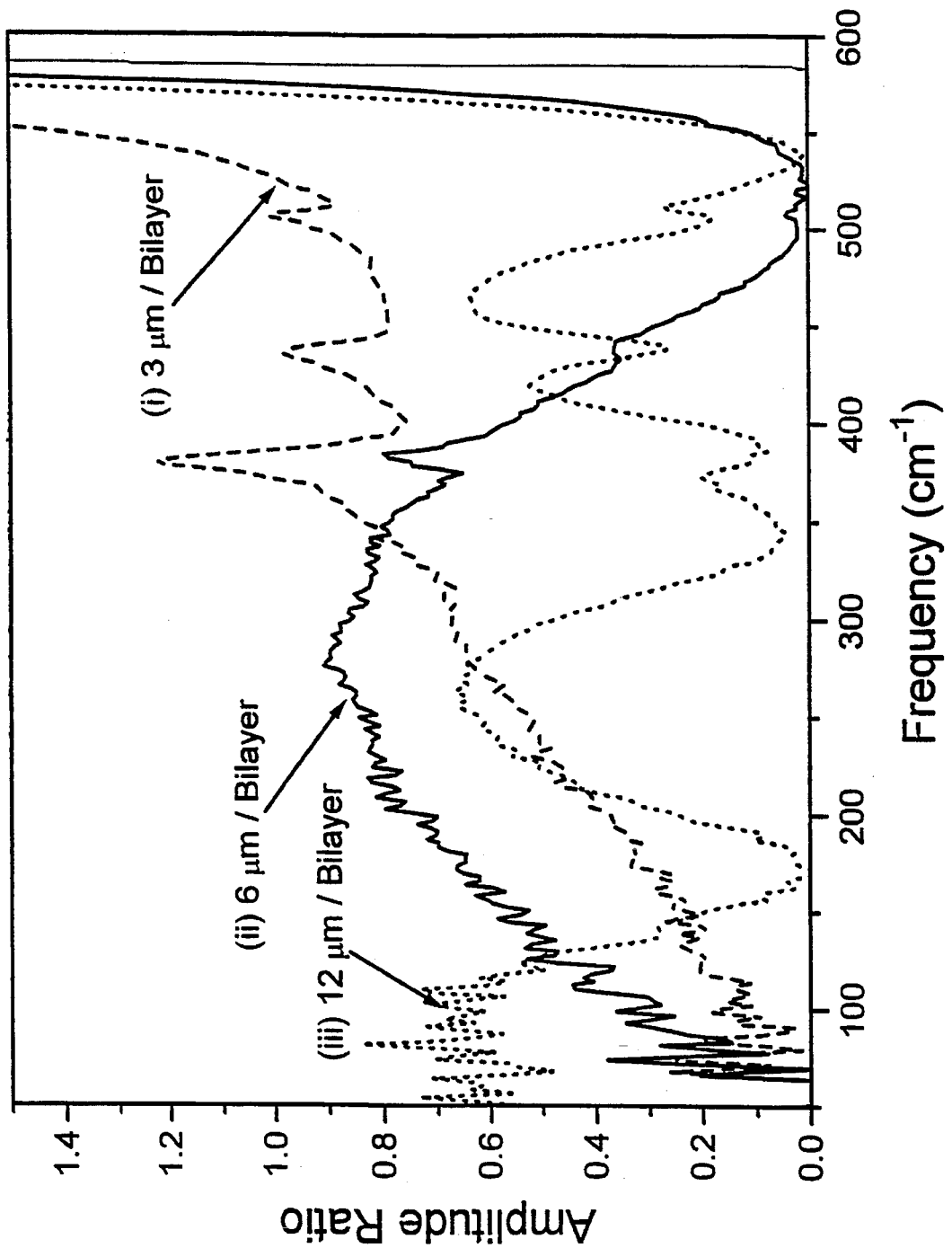
FIG. 6 is a graph illustrating the comparative performance of a 2.08 micron coating of germanium on a 6 micron Mylar film, to various thicknesses of bare Mylar films.

FIG. 5 depicts what occurs if the Ge layer in the bilayer beamsplitter is made thicker; i.e. 2.08 μm of Ge on 6 μm of Mylar. Basically, a very efficient beamsplitter was obtained but with the highest frequency for the beamsplitter reduced to less than 550 cm$^{-1}$, a situation that causes this beamsplitter to violate our design criteria. Comparing FIGS. 6 and 5, it can be seen that the bilayer beamsplitter with 2.08 μm of Ge actually is more efficient than the bilayer beamsplitter with 1.8 μm of germanium, but that the spectral range is reduced at the higher frequencies.

This demonstrates that we explored a range of Ge thicknesses from 1 to 2.1 μm for our bilayer beamsplitter when arriving at the optimum Ge thickness of 1.75 μm.

Discussion

We have demonstrated that it is possible to produce using thin-film deposition techniques a bilayer far-infrared beamsplitter for FT-IR spectrometers operating in the spectral range from 20 to 600 cm–1. Various materials and fabrication methods have been investigated with the result that a cost-effective, large-volume technique has been found to produce the beamsplitters using equipment to be found in most thin-film laboratories. The bilayer beamsplitters demonstrated herein are clearly superior to the commercially available beamsplitters employing single mylar layers both with regard to absolute beamsplitter efficiency and spectral range for frequencies from 37 to 550 cm–1. In this spectral range, we have shown that one bilayer beamsplitter can replace four single-layer mylar beamsplitters with better performance. The bilayer beamsplitter has proven to be stable over a period of months and, polarization effects with it are not drastic.

References

[1] E. D. Palik, Handbook of Optical Constants I (Academic Press, Orlando, Fla., 1985).

[2] M. Cuisenier, A. Marten, and J. Mondellini, "Interférometres de Fourier dans l'infrarouge lointain et le submillimétrique. Etude comparative de leurs performances en rue d'applications spatiales" J. Optics (Paris), 23, 179–198 (1992).

[3] D. H. Martin, "Polarizing (Martin-Puplett) interferometric spectrometers for near- and submillimeter spectra", Chapter 2 of Volume 6 of Infrared and Millimeter Waves: Systems and Components edited by K. J. Button, Academic Press, New York (1982).

[4] M. J. Dignam and M. D. Baker, "Analysis of a polarizing Michelson interferometer for dual beam Fourier transform infrared, circular dichroism infrared, and reflectance ellipsometric infrared spectroscopies", Applied Spectroscopy, 35, 186–193 (1981).

[5] B. Carli, M. Carlotti, F. Mencaraglia, and E. Rossi, "Far-infrared high-resolution Fourier transform spectrometer", Applied Optics, 26, 3818–3822 (1987).

[6] A. E. Martin, "Infrared interferometric spectrometers", Volume 8 of Vibrational Spectra and Structure edited by J. R. Durig, Elsevier Scientific Publishing Company, Amsterdam (1980).

[7] G. Kampffmeyer and A. Pfeil, "Self-supporting thin-film beam splitter for far-infrared interferometers", Applied Physics, 14, 313–317 (1977).

[8] H. A. Gebbie and G. A. Vanasse, Nature, 178, 432 (1956).

We claim:

1. A composite material for use in a far infrared beam splitter, consisting essentially of a substrate in the form of a thin, substantially uniformly thick film of polyethyleneterephthalate, and a substantially uniform thickness coating of the element germanlure, wherein the coating thickness is 1 to 2.1 microns.

2. A composite according to claim 1, wherein the coating thickness is 1.75 microns.

3. A composite according to claim 1, wherein the thickness of the substrate is about 6 microns.

4. A composite according to claim 2, wherein the thickness of the substrate is about 6 microns.

5. A composite according to claim 1, additionally comprising an overcoating of a material selected from the group consisting of $SiO_2$ and $Al_2O_3$ of a thickness of 20–60 nm.

6. A composite according to claim 1, wherein the coating is applied by vacuum deposition.

\* \* \* \* \*

UNITED STATES PATENT AND TRADEMARK OFFICE
CERTIFICATE OF CORRECTION

PATENT NO. : 5,558,934
DATED : September 24, 1996
INVENTOR(S) : Nelson L. Rowell, et al It is certified that error appears in the above-indentified patent and that said Letters Patent is hereby corrected as shown below:

Column 1 line 51,
In the claims, claim 1 " of the element germanlure" should read -- of the element germanium--.

Signed and Sealed this

Twenty-fifth Day of November, 1997

Attest:

BRUCE LEHMAN

Attesting Officer      Commissioner of Patents and Trademarks